United States Patent
Noresson (10) Patent No.: US 12,447,965 B2
(45) Date of Patent: Oct. 21, 2025

(54) METHOD FOR STOPPING AN AUTONOMOUS VEHICLE

(71) Applicant: Volvo Autonomous Solutions AB, Gothenburg (SE)

(72) Inventor: Oskar Noresson, Mölndal (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 83 days.

(21) Appl. No.: 18/485,364

(22) Filed: Oct. 12, 2023

(65) Prior Publication Data
US 2024/0123992 A1   Apr. 18, 2024

(30) Foreign Application Priority Data
Oct. 14, 2022   (EP) .................................... 22201498

(51) Int. Cl.
*B60W 30/18* (2012.01)
*B60W 60/00* (2020.01)

(52) U.S. Cl.
CPC ........ *B60W 30/181* (2013.01); *B60W 60/001* (2020.02); *B60W 2300/125* (2013.01)

(58) Field of Classification Search
CPC ............. B60W 30/181; B60W 60/001; B60W 2300/125; B60W 2300/12; B60W 2420/403; B60W 2420/408; B60W 2510/0657
See application file for complete search history.

(56) References Cited

U.S. PATENT DOCUMENTS

| 2005/0236894 | A1* | 10/2005 | Lu | B62D 11/08 |
| | | | | 303/139 |
| 2018/0111608 | A1* | 4/2018 | Kim | B60W 50/14 |
| 2018/0339702 | A1* | 11/2018 | Kim | G06V 20/58 |
| 2019/0001965 | A1* | 1/2019 | Cho | B60W 30/025 |
| 2022/0126859 | A1* | 4/2022 | Luo | B60R 1/12 |

FOREIGN PATENT DOCUMENTS

| EP | 3869291 A2 | 8/2021 |
| WO | 2018039114 A1 | 3/2018 |
| WO | 2020014090 A1 | 1/2020 |
| WO | 2022111803 A1 | 6/2022 |

OTHER PUBLICATIONS

Extended European Search Report in corresponding European Application No. 22201498.7 dated Mar. 20, 2023 (11 pages).

\* cited by examiner

*Primary Examiner* — Peter D Nolan
*Assistant Examiner* — Anwar Mohamed
(74) *Attorney, Agent, or Firm* — Venable LLP; Jeffri A. Kaminski (57) ABSTRACT

A computer-implemented method for stopping an autonomous vehicle at a stopping location defined by a protrusion or a recess formed with respect to a ground surface on which the vehicle is travelling is provided. The method includes detecting that at least a portion of the vehicle is located above the protrusion or recess, in response to said detection, initiating a stop of the vehicle. Detecting that at least a portion of the vehicle is located above the protrusion or recess may include detecting an increase in engine torque or power, and/or detecting a difference in vehicle-to-ground distance.

13 Claims, 3 Drawing Sheets

METHOD FOR STOPPING AN AUTONOMOUS VEHICLE

TECHNICAL FIELD

The disclosure relates generally to operation of autonomous vehicles. In particular aspects, the disclosure relates to a method for stopping an autonomous vehicle at a stopping location and to a control system for controlling an autonomous vehicle. The disclosure can be applied in autonomous heavy-duty vehicles, such as trucks, buses, and construction equipment. Although the disclosure may be described with respect to an autonomous working machine in the form of an autonomous dump truck, the disclosure is not restricted to any particular vehicle.

BACKGROUND

Autonomous vehicles are typically equipped with a localization system used for vehicle navigation as well as collision prevention. The localization system includes various sensors and devices. The localization system may on the one hand include a satellite navigation device and various sensors attached to a drivetrain of the vehicle, e.g., accelerometers, gyroscopes, magnetometers, etc. enabling dead reckoning. The localization system may on the other hand include radar (radio detection and ranging) based sensors, cameras, and LIDAR (light detection and ranging) based sensors, adapted to sense the presence of objects in the vicinity of the vehicle and adapt the vehicle operation in view thereof.

A difficulty arises when the autonomous vehicle is required to operate with a very high precision, such as in connection with high precision stopping of the vehicle. Such high precision stopping may be required for example at working sites, where the vehicle is required to unload goods or material at a precise position. For example, this situation arises when an autonomous dump truck is used in a quarry for delivering material to a crusher or similar. In order to be able to tip the material into the crusher, the vehicle has to stop at an exact stopping location. Depending on the precision of the localization system, this may however be difficult to achieve.

SUMMARY

According to a first aspect of the disclosure, a computer-implemented method for stopping an autonomous vehicle at a stopping location is provided. The stopping location is defined by a protrusion, or a recess, formed with respect to a ground surface on which the vehicle is travelling. The method comprises:
 detecting that at least a portion of the vehicle is located above the protrusion or recess,
 in response to said detection, initiating a stop of the vehicle.

The first aspect of the disclosure may seek to provide a method which is in at least some aspect improved, or at least presents an alternative, to known methods for stopping an autonomous vehicle at a defined stopping location. By detecting that at least a portion of the vehicle is located above the protrusion or recess and in response thereto initiating a stop of the vehicle, a reliable method for precision stopping of the vehicle may be achieved. The method may provide a better precision than methods using the navigation system of the vehicle, and/or that rely on the detection of objects located ahead of the vehicle in a travelling direction of the vehicle for initiating a stop.

When the stopping location is defined by a protrusion formed with respect to the ground surface, the protrusion may, e.g., be a curb, a bump, a bar, or similar. When the stopping location is defined by a recess formed with respect to the ground surface, the recess may, e.g., be a trench, a ditch, or similar. Preferably, the recess or the protrusion can be formed to have an extension in a transverse direction of the vehicle, i.e., perpendicular to a likely travelling direction of the vehicle as it approaches the stopping location, which is at least equal to a vehicle width, or which is larger than the vehicle width. However, the transverse extension may in some cases be smaller than the vehicle width.

The method according to the first aspect is intended to be performed at relatively low vehicle speeds, such as at vehicle speeds below 10 km/h, preferably below 7 km/h, more preferably below 5 km/h. The method is thereby intended for stopping at the defined stopping location with a relatively high precision.

The initiation of the stop of the vehicle may be performed such that the vehicle is stopped when it reaches the stopping location. The stopping location may preferably be considered reached when a ground engaging member of the vehicle engages with the recess or protrusion. Alternatively, it may be considered reached when the recess or protrusion is detected by a sensor provided below the vehicle.

Optionally, detecting that at least a portion of the vehicle is located above the protrusion or recess comprises at least:
 monitoring an engine torque or power required for propelling of the vehicle at a requested vehicle speed in a travelling direction, and
 detecting a sudden increase in the monitored engine torque or power.

Hence, once detecting that there is a sudden increase in the engine torque or power required to continue propelling of the vehicle in the travelling direction, it is determined that the vehicle is located above the protrusion or recess. The increase in torque or power is the result of at least one ground engaging member of the vehicle, such as a wheel, engaging with the recess or with the protrusion. Stopping of the vehicle is initiated once the sudden increase in engine torque or power is detected. This provides a robust method for determining with high precision that the stopping location is reached. The sudden increase in the monitored engine torque or power may, e.g., be defined by a rate of change of the monitored engine torque or power being above a threshold. The sudden increase may, e.g., be seen as a momentary increase.

The "engine torque" is herein to be understood as the output torque of at least one propulsion unit of the vehicle, wherein the at least one propulsion unit may comprise an internal combustion engine and/or one or more electric machines. Hence, the engine torque may be understood as the total output torque from the one or more propulsion units which is/are currently used for propelling the vehicle. Correspondingly, the power is the total output power from the one or more propulsion units which is/are currently used for propelling the vehicle.

Optionally, detecting the sudden increase in the engine torque or power comprises detecting that the engine torque or power is above a threshold level. This is a simple way of determining that the ground engaging member/s has/have reached the recess or protrusion.

Optionally, the method further comprises defining the threshold level in dependence on a base level of the engine torque or power, the base level being indicative of an engine torque or power required to propel the vehicle at the requested vehicle speed prior to reaching the protrusion or recess. The base level may herein be determined from the monitored engine torque or power, such as an average engine torque or power over a defined time period, or a running average. In this way, the threshold level may be set in dependence on the vehicle weight and/or the slope of the ground on which the vehicle is travelling.

Optionally, detecting that at least a portion of the vehicle is located above the protrusion or recess comprises at least:
monitoring a distance between a fixed point on the vehicle and the ground surface, and
detecting a difference in the monitored distance.

In this case, the distance to the ground may be measured by a distance measurement sensor such as a radar (radio detection and ranging) based sensor, a camera, or a LIDAR (light detection and ranging) based sensor. The sensor or camera may be located below the vehicle, looking down onto the ground surface below the vehicle. The stopping may be initiated such that the vehicle is stopped immediately, or it may be initiated such that the vehicle stops once a pair of ground engaging members reaches the protrusion or recess. A known distance between the distance measurement sensor and the pair of ground engaging members may be used to determine when the vehicle is to be stopped. In some examples, the detection of the difference in the monitored difference may trigger a reduction in vehicle speed and/or a monitoring of the engine torque or power, wherein the vehicle is stopped once the sudden increase in the monitored engine torque or power is detected, i.e., when at least one of the ground engaging members engages with the protrusion or recess.

Optionally, detecting the difference in the monitored distance comprises detecting that the monitored distance is outside of a predefined distance range, such as above or below a threshold level. When the stopping location is defined by a recess, the monitored distance may be determined to be outside of the predefined distance range when it is larger than an upper limit of the range. When the stopping location is defined by a protrusion, the monitored distance may be determined to be outside of the predefined distance range when it is smaller than a lower limit of the range.

Optionally, the method further comprises:
detecting that a predetermined activation condition is fulfilled,
in response to detecting that the activation condition is fulfilled, activating the monitoring of at least one of:
the engine torque or power required for propelling of the vehicle at the requested vehicle speed, and
the distance between the fixed point on the vehicle and the ground surface.

By activating the monitoring once the activation condition is fulfilled, unnecessary monitoring of the ground surface far from the stopping location is avoided. This on the one hand reduces the risk of unwanted stops far from the intended stopping location, and on the other hand reduces the amount of data collected and stored as a result of the monitoring. It is to be noted that the monitoring of the engine torque or power and the distance between the fixed point on the vehicle and the ground surface may be initiated at different points in time. For example, the monitoring of the distance may be started once the activation condition is fulfilled, while the monitoring of the engine torque or power may be started once a change in the distance between the fixed point on the vehicle and the ground surface is detected.

Optionally, detecting that the predetermined activation condition is fulfilled comprises detecting that the vehicle is within a zone, such as a predefined zone, in which the stopping location is located. Thus, the activation condition is considered fulfilled when the vehicle is within the zone.

Optionally, detecting that the vehicle is within the zone comprises using a navigation system of the vehicle. The navigation system may, e.g., include a satellite navigation device and various sensors attached to a drivetrain of the vehicle, e.g., an accelerometer, a gyroscope, a magnetometer, etc., enabling dead reckoning. So-called geofencing may hence be used to determine that the vehicle is within the zone, such as the predefined zone.

Alternatively, or additionally, detecting that the vehicle is within the zone may comprise using object detection sensors of the vehicle, such as at least one radar-based sensor, and/or at least one LIDAR based sensors, and/or at least one camera. This requires that the zone comprises detectable features characteristic of the zone. For example, it may be detected that the vehicle is within the zone once the recess or protrusion is detected by an object detection sensor looking onto the ground ahead of the vehicle as seen in the travelling direction. In this case, it is not necessary that the zone is predefined.

Optionally, the method further comprises, in response to detecting that the predetermined activation condition is fulfilled, reducing the vehicle speed. For example, the vehicle speed may be reduced to the requested vehicle speed. This allows the vehicle to travel at a higher vehicle speed outside of the predefined zone, thereby increasing productivity.

Optionally, detecting that at least a portion of the vehicle is located above the protrusion or recess comprises at least:
monitoring a tire pressure and/or an air suspension pressure of the vehicle,
detecting a sudden difference in the monitored tire pressure and/or air suspension pressure.

Based on the detected difference in pressure, it can be determined that at least the portion of the vehicle is located above the protrusion or recess, i.e., that at least one ground engaging member of the vehicle has engaged with the protrusion or recess and as a result thereof, there is a difference in pressure. Monitoring the tire pressure or the air suspension pressure may preferably be performed in addition to the monitoring of the engine torque or power, and/or in addition to the monitoring of the distance as described above, to improve the reliability of the detection of the protrusion or recess.

Optionally, initiating the stop comprises discontinuing a power transfer to ground engaging members of the vehicle. Alternatively, or additionally, initiating the stop may comprise activating a vehicle brake. At the slow vehicle speed near the precision stop, it may typically be sufficient to cease power transfer to stop the vehicle once the ground engaging member/s engage/s with the protrusion or recess.

According to a second aspect of the disclosure, a computer program product comprising program code for performing the method of the first aspect when said program is run on a processor device is provided.

According to a third aspect of the disclosure, a non-transitory computer-readable storage medium comprising instructions, which when executed by a processor device, cause the processor device to perform the method according to the first aspect is provided.

According to a fourth aspect of the disclosure, a control system for controlling an autonomous vehicle, the control system comprising one or more electronic control units being configured to perform the method according to the first aspect, is provided. Advantages of the fourth aspect of the disclosure are analogous to the advantages of the first aspect of the disclosure. It shall also be noted that all embodiments of the first aspect of the disclosure are combinable with all embodiments of the fourth aspect of the disclosure.

Optionally, the control system further comprises at least one engine torque sensor and/or at least one distance measurement sensor communicatively connected to the one or more control units. The control system may further comprise at least one pressure sensor configured to measure the tire pressure and/or the air suspension pressure.

According to a fifth aspect of the disclosure, a vehicle comprising the control system according to the fourth aspect is provided. The vehicle may be an autonomous vehicle, i.e., a vehicle adapted to be autonomously operated. The vehicle may comprise a navigation system.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

The drawings are schematic and not drawn to scale.

DETAILED DESCRIPTION

Aspects set forth below represent the necessary information to enable those skilled in the art to practice the disclosure.

Figure 1:
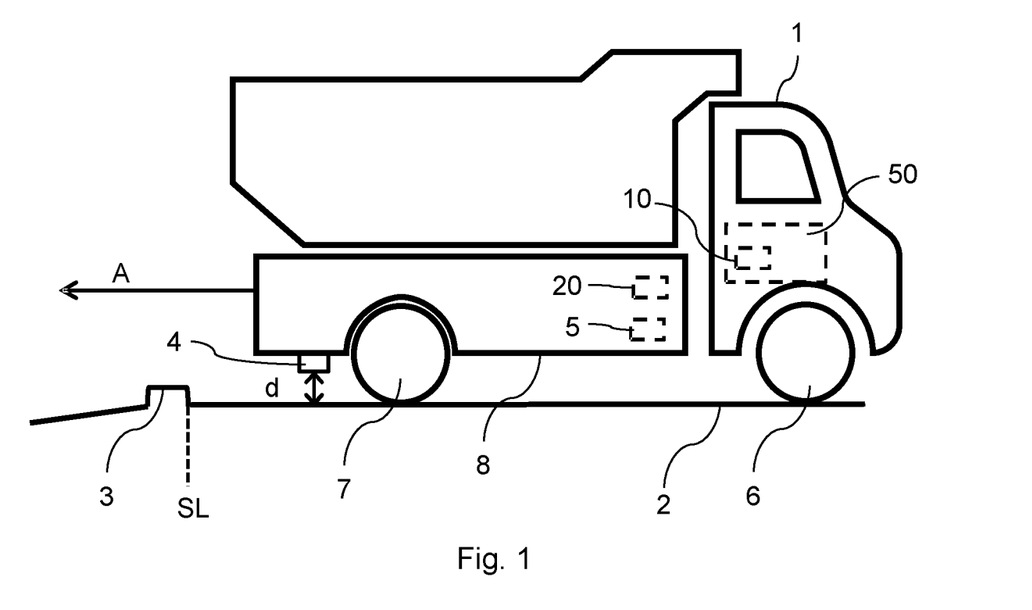
FIG. 1 is a schematic overview of a vehicle according to an embodiment.

FIG. 1 schematically shows an autonomous vehicle 1 according to an embodiment of the disclosure. The vehicle 1 is in the form of an autonomous dump truck comprising a first pair of ground engaging members 6 and a second pair of ground engaging members 7, wherein all ground engaging members 6, 7 are in the form of wheels 6, 7. The vehicle 1 may in other embodiments comprises more than two pairs of ground engaging members, or a single pair of ground engaging members other than wheels, such as crawlers. The vehicle 1 further comprises a powertrain (not shown), wherein the powertrain comprises an internal combustion engine and/or at least one electric machine (not shown) in the form of a motor, e.g., two electric machines, connected to at least one of the wheel pairs to provide propulsion power for propelling the vehicle 1. The vehicle 1 further comprises a control system 50 for controlling stopping of the vehicle 1, wherein the control system 50 comprises one or more electronic control units 10. The vehicle 1 further comprises an engine torque sensor 5 and a distance measurement sensor 4, wherein the sensors 4, 5 may form part of the control system 50, or be separate from the control system 50 and configured to communicate with a unit thereof by wired or wireless communication. The distance measurement sensor 4 is provided on a lower surface 8 of the vehicle 1, facing the ground surface 2. It is configured to monitor a distance d between a fixed point of the vehicle 1 and the ground surface 2, wherein the fixed point is defined by the position of the sensor 4 on the vehicle 1. The distance d will in the following also be referred to as the vehicle-to-ground distance d. The distance measurement sensor 4 may, by way of example, be a radar-based sensor, a LIDAR based sensor, or a stereo camera. More than one distance measurement sensor 4 may be provided, such as at different locations of the lower surface 8. The engine torque sensor 5 may be a sensor configured to detect the output torque from the internal combustion engine and/or from the at least one electric machine, such as an inline torque sensor or a reaction torque sensor.

The vehicle 1 in the depicted example further comprises a navigation system 20, comprising a satellite navigation device (not shown) and one or more sensors (not shown) attached to a drivetrain of the vehicle, e.g., an accelerometer, a gyroscope, a magnetometer, etc., enabling dead reckoning. The vehicle 1 further comprises a plurality of object detection sensors (not shown) such as at least one radar-based sensor, and/or at least one LIDAR based sensors, and/or at least one camera, arranged on different locations of the vehicle 1 to provide views of an area surrounding the vehicle 1 and to detect any objects being in the vicinity of the vehicle, in particular in a travelling direction of the vehicle 1.

The vehicle 1 is in FIG. 1 depicted as travelling on a ground surface 2, in a rearward travelling direction A toward a stopping location SL defined by a protrusion 3. The protrusion 3, which may, e.g., be a curb, a pile, a bar, or similar, protrudes with respect to the ground surface 2. In other embodiments, the stopping location SL may be defined by a recess formed with respect to the ground surface 2 instead of being defined by a protrusion 3. Such a recess may be a ditch, a hole, a trench or similar.

Figure 3:
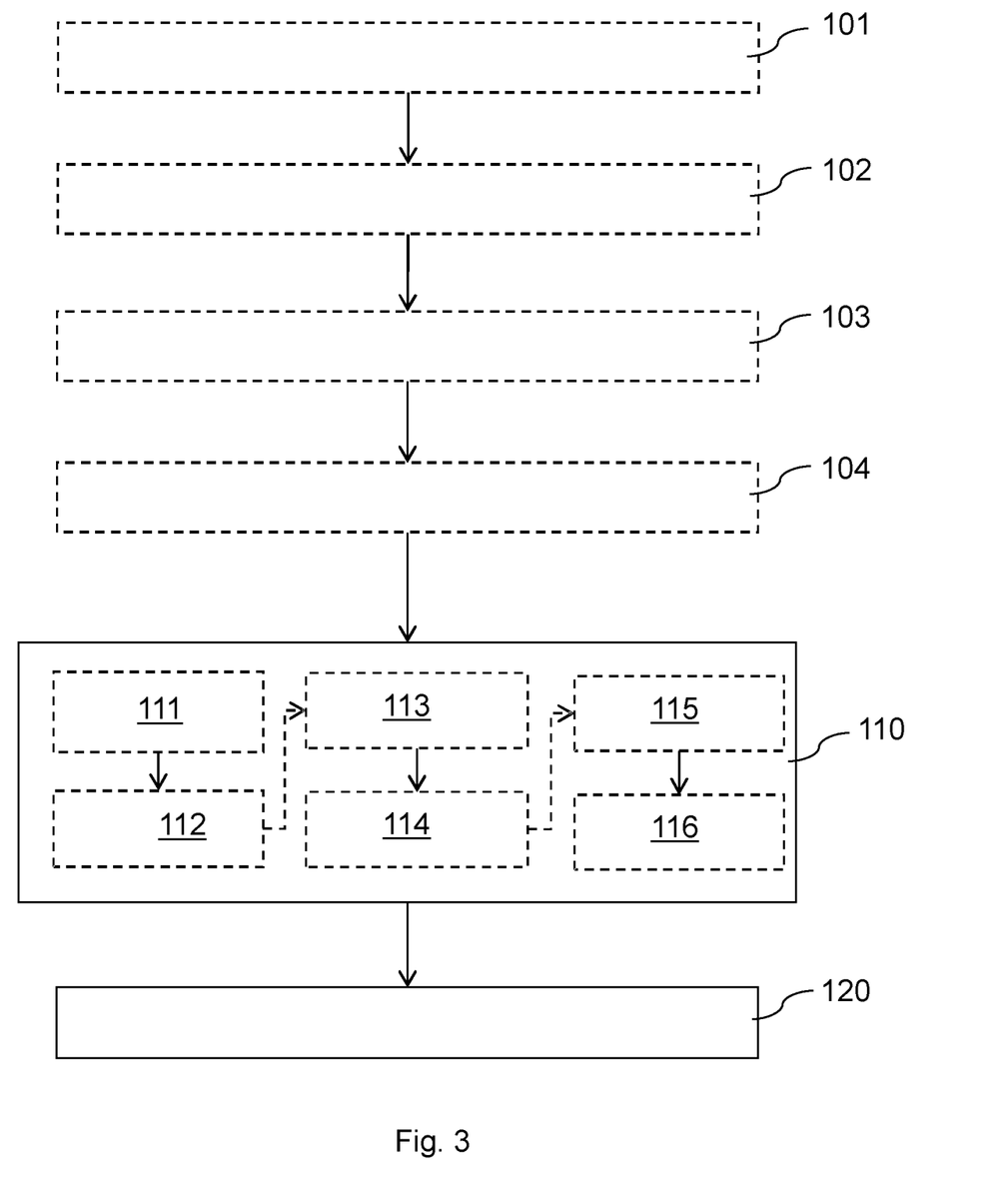
FIG. 3 is a flow chart illustrating an exemplary method according to the disclosure.

FIG. 3 illustrates a computer-implemented method according to an example of the disclosure. The method comprises the following actions, wherein optional actions are marked with dashed lines in FIG. 3:

Action 110: detecting that at least a portion of the vehicle 1 is located above the protrusion 3 or the recess. This action may in turn include an action 111 of monitoring the distance d between the fixed point on the vehicle 1 and the ground surface 2, and an action 112 of detecting 112 a difference in the monitored distance d. The difference in the monitored distance d is indicative of the distance measurement sensor 4 being located above the protrusion 3, or the recess, if a recess is provided instead of a protrusion. Hence, once the distance measurement sensor 4 is above the protrusion 3, at least a portion of the vehicle 1 is located above the protrusion 3. Detecting the difference in the monitored distance d may comprise detecting that the monitored distance d is outside of a predefined distance range, such as above or below a threshold level $d_{th}$, depending on whether the stoppling location SL is defined by a recess or a protrusion 3.

Action 120: in response to said detection in action 110, initiating a stop of the vehicle 1. The detection may herein refer to either the detection of difference in the monitored distance d, or the detection of the difference in the monitored distance d.

The action 110 may, as an alternative or in addition to the actions 111, 112, comprise an action 113 of monitoring the engine torque T or power required for propelling of the vehicle 1 at a requested vehicle speed in the travelling direction A. It may in this case further comprise an action 114 of detecting a sudden increase in the monitored engine torque T or power. The sudden increase in the monitored torque T or power is indicative of at least one ground engaging member 6, 7 of the vehicle 1 having reached the protrusion 3 or the recess. Detecting the sudden increase in the engine torque or power may, e.g., comprises detecting that the engine torque T or power is above a threshold level $T_{th}$.

The action 110 of detecting that at least a portion of the vehicle 1 is located above the protrusion or recess may further comprise an action 115 of monitoring a tire pressure and/or an air suspension pressure of the vehicle 1, such as by using suitable sensors. This action 115 may be performed as a complement to the action 111 of monitoring the vehicle-to-ground distance d, or as an alternative thereto. The action 115 may further be performed as a complement or alternative to the action 113 of monitoring the engine torque T or power.

When the action 115 of monitoring the tire pressure and/or the air suspension pressure is performed, the action 110 may further comprise an action 116 of detecting a sudden difference in the monitored tire pressure and/or air suspension pressure. Based on the detected difference in pressure, it can be determined that at least the portion of the vehicle 1 is located above the protrusion 3 or recess, i.e., that at least one ground engaging member 6, 7 of the vehicle 1 has engaged with the protrusion 3 or recess and as a result thereof, there is a difference in pressure.

Hence, the action 110 of detecting that at least a portion of the vehicle 1 is located above the protrusion or recess may comprise monitoring any one or more of the engine torque T or power, the vehicle-to-ground distance d, and the tire pressure and/or air suspension pressure. Preferably, a combination of at least two of those is used.

The method may in some examples be initiated by an action 101 of detecting that a predetermined activation condition is fulfilled. In response to detecting that the activation condition is fulfilled, the method may further comprise an action 102 of activating the monitoring of at least one of the engine torque T or power required for propelling of the vehicle 1 at the requested vehicle speed, and/or the distance d between the fixed point on the vehicle 1 and the ground surface 3. Hence, one or both of the engine torque sensor 5 and the distance measurement sensor 4 may be activated as the activation condition is fulfilled. If the method comprises the action 115 of monitoring the tire pressure and/or the air suspension pressure, this action may also be initiated in response to detecting that the predetermined activation condition is fulfilled.

The action 102 of detecting that the predetermined activation condition is fulfilled may comprise detecting that the vehicle 1 is within a zone, such as a predefined zone, in which the stopping location SL is located. The zone may be a predefined zone defined by, e.g., geographic coordinates of the zone. Geofencing may be used to determine that the vehicle 1 is within the zone, such as by using the navigation system 20 of the vehicle 1 and/or by using the object detection sensors of the vehicle 1. The activation condition is considered fulfilled when the vehicle 1 is detected to be within the zone. Another option for detecting that the predetermined condition is fulfilled is to detect that the vehicle 1 is travelling along a known travelling route ending at a stopping location SL. Travelling routes ending at a stopping location SL may be identified and labeled so that, when it is detected that the vehicle 1 follows such a route, the activation condition is considered fulfilled.

The method may further comprise an action 103 of reducing the vehicle speed in response to detecting that the predetermined activation condition is fulfilled. The vehicle speed may be reduced to a low speed corresponding to creeping. For example, the vehicle speed may be reduced to be below 10 km/h, preferably below 7 km/h, or more preferably below 5 km/h. This action may be performed in connection with the action 102 as described above.

The vehicle speed may alternatively, or additionally, be reduced in connection with the distance measurement sensor 4 being located above the protrusion 3, or the recess. Hence, the vehicle speed may be reduced to a first level when the activation condition is fulfilled, and to a second level, lower than the first level, when it is detected that the vehicle-to-ground distance d changes as a result of the distance measurement sensor 4 passing over the protrusion 3 or the recess.

The method may further comprise an action 104 of defining the engine torque threshold level $T_{th}$ in dependence on a base level of the engine torque T or power, the base level being indicative of an engine torque T or power required to propel the vehicle 1 at the requested vehicle speed prior to reaching the protrusion 3 or recess. The threshold level T th is herein set to a level which is dependent on the base level, such as being a predetermined amount higher than the base level. The threshold level $T_{th}$ may thus be set to a lower value when the vehicle 1 is travelling on a level ground than when the vehicle 1 is travelling in an uphill slope. The action 104 may be performed regardless of whether any one or all of the actions 101-103 are performed.

The action 120 of initiating the stop may comprise discontinuing a power transfer to the ground engaging members 6, 7 of the vehicle 1. Alternatively, or additionally, initiating the stop may comprise activating a vehicle brake.

Figure 2:
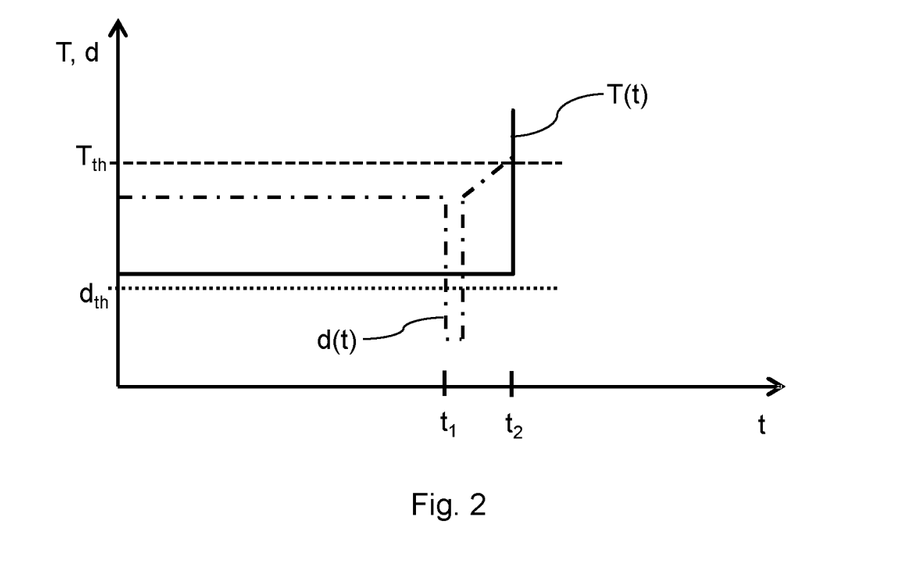
FIG. 2 is a diagram showing engine torque and vehicle-to-ground distance as a function of time.

FIG. 2 schematically illustrates engine torque T and vehicle-to-ground distance d as measured by the engine torque sensor 5 and the distance measurement sensor 4, respectively, as functions of time t when the vehicle 1 is driven toward a stopping location SL in the form of a protrusion 3. The solid line illustrates engine torque T(t) as measured by the engine torque sensor 5 and the dash-dotted line illustrates vehicle-to-ground distance d(t) as measured by the distance measurement sensor 4. The stopping location SL is herein defined such that it is considered reached when the second pair of ground engaging members 7 engages with the protrusion 3. This happens at the time $t_2$ and results in a sudden increase in engine torque T. The engine torque T is herein illustrated to rapidly increase above the torque threshold level $T_{th}$. Hence, the vehicle 1 is immediately stopped.

The distance measurement sensor 4 reaches the protrusion 3 at the time $t_1$, i.e., before the time $t_2$ when the ground engaging member 7 reaches the protrusion 3. The distance d is reduced to being below a threshold level $d_{th}$ when the distance measurement sensor 4 is located directly above the protrusion 3, and thereafter increases again as the vehicle 1 proceeds toward the stopping location SL. In some examples, the vehicle speed may be reduced once the distance measurement sensor 4 detects that the vehicle-to-ground distance d is outside of a predefined distance range, such as below the threshold level $d_{th}$. Furthermore, in some examples, the monitoring of the engine torque T may be initiated once the detected vehicle-to-ground distance d is outside of the predefined distance range.

Figure 4:
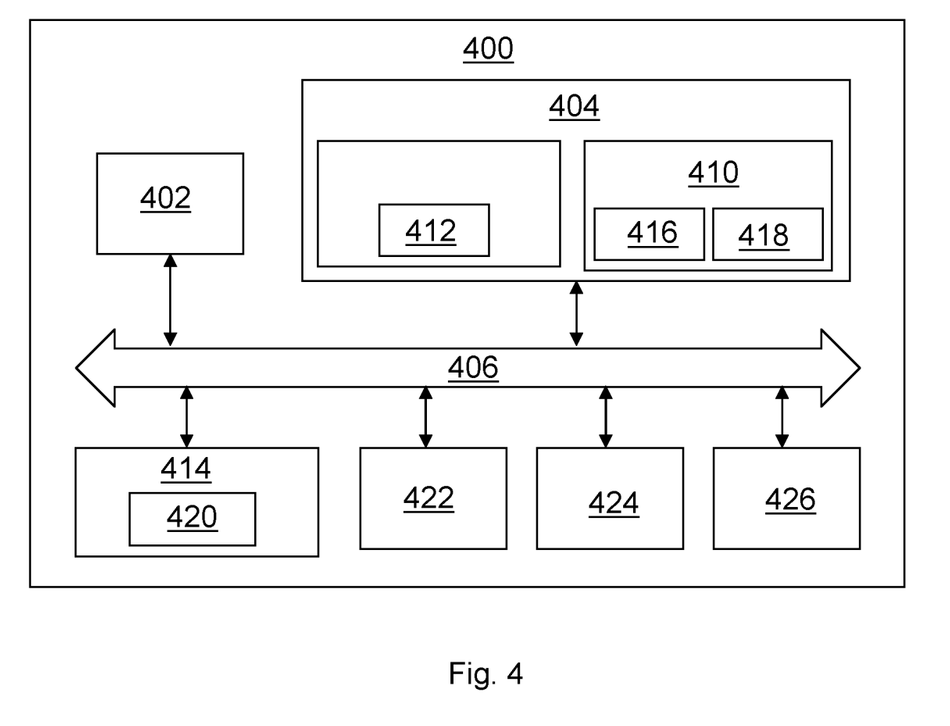
FIG. 4 is a schematic diagram of an exemplary computer system for implementing examples disclosed herein, according to one example.

FIG. 4 is a schematic diagram of a computer system 400 for implementing examples disclosed herein, such as in the control system 50 illustrated in FIG. 1. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, the computer system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include one or more electronic control units 402, such as the control unit 10 illustrated in FIG. 1, which may also be referred to as a processor device, a memory 404, and a system bus 406. The computer system 400 may include at least one computing device having the control unit 402. The system bus 406 provides an interface for system components including, but not limited to, the memory 404 and the control unit 402. The control unit 402 may include any number of hardware components for conducting data or signal processing or for executing computer code stored in memory 404. The control unit 402 (e.g., processor device) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The control unit may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the control unit 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with a control unit 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program product 420 stored on a transitory or non-transitory computer-usable or computer-readable storage medium (e.g., single medium or multiple media), such as the storage device 414, which includes complex programming instructions (e.g., complex computer-readable program code) to cause the control unit 402 to carry out the steps described herein. Thus, the computer-readable program code can comprise software instructions for implementing the functionality of the examples described herein when executed by the control unit 402. The control unit 402 may serve as a controller or control system for the computer system 400 that is to implement the functionality described herein, such as for the control system 50 illustrated in FIG. 1.

The computer system 400 also may include an input device interface 422 (e.g., input device interface and/or output device interface). The input device interface 422 may be configured to receive input and selections to be communicated to the computer system 400 when executing instructions, such as from a keyboard, mouse, touch-sensitive surface, etc. Such input devices may be connected to the processor device 402 through the input device interface 422 coupled to the system bus 406 but can be connected through other interfaces such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may also include a communications interface 426 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method for stopping an autonomous vehicle at a stopping location defined by a protrusion or a recess formed with respect to a ground surface on which the vehicle is travelling, the method comprising:
   detecting that at least a portion of the vehicle is located above the protrusion or recess, in response to said detection, initiating a stop of the vehicle,
   wherein detecting that at least a portion of the vehicle is located above the protrusion or recess comprises at least:
   monitoring an engine torque or power required for propelling of the vehicle at a requested vehicle speed in a travelling direction, and
   detecting a sudden increase in the monitored engine torque or power.

2. The method according to claim 1, wherein detecting the sudden increase in the engine torque or power comprises detecting that the engine torque or power is above a threshold level.

3. The method according to claim 2, further comprising:
   defining the threshold level in dependence on a base level of the engine torque or power, the base level being indicative of an engine torque or power required to propel the vehicle at the requested vehicle speed prior to reaching the protrusion or recess.

4. The method according to claim 1, wherein detecting that at least a portion of the vehicle is located above the protrusion or recess comprises:
   monitoring a distance between a fixed point on the vehicle and the ground surface, and detecting a difference in the monitored distance.

5. The method according to claim 4, wherein detecting the difference in the monitored distance comprises detecting that the monitored distance is outside of a predefined distance range, such as above or below a threshold level.

6. The method according to claim 1, further comprising:
   detecting that a predetermined activation condition is fulfilled,
   in response to detecting that the activation condition is fulfilled, activating the monitoring of at least one of:
   the engine torque or power required for propelling of the vehicle at the requested vehicle speed, and
   the distance between the fixed point on the vehicle and the ground surface.

7. The method according to claim 6, wherein detecting that the predetermined activation condition is fulfilled comprises:
   detecting that the vehicle is within a zone in which the stopping location is located.

8. The method according to claim 7, wherein detecting that the vehicle is within the zone comprises using a navigation system of the vehicle.

9. The method according to claim 6, further comprising:
   in response to detecting that the predetermined activation condition is fulfilled, reducing the vehicle speed.

10. A non-transitory computer-readable storage medium comprising instructions, which when executed by a processor device, cause the processor device to perform the method of claim 1.

11. A control system for controlling an autonomous vehicle, the control system comprising one or more electronic control units being configured to perform the method according to claim 1.

12. The control system according to claim 11, further comprising at least one engine torque sensor and/or at least one distance measurement sensor communicatively connected to the one or more control units.

13. A vehicle comprising the control system of claim 11.

* * * * *